3,565,659
PROCESS FOR PRODUCING CARBON BLACK PELLETS FOR INK FORMULATIONS
Theodore Dickerson, Monroe, La., assignor to Cities Service Company, a corporation of Delaware
No Drawing. Filed Feb. 1, 1968, Ser. No. 702,198
Int. Cl. B02c *19/06;* C09c *1/56, 1/60*
U.S. Cl. 106—307                                         13 Claims

ABSTRACT OF THE DISCLOSURE

Fluffy particles of the carbon black are violently agitated in comixture wth a micro-atomized fog of oil particles and the agitation is continued until the carbon black particles are uniformly coated with oil. Thereafter, the oil coated particles are recombined into a bed and pelletized by means of a relatively mild tumbling action. The resultant pellets are used in printing ink formulations, e.g. newsinks.

BACKGROUND OF THE INVENTION

Ink pellets can be produced by uniformly dispersing over the particles of a mass of carbon black—prior to any substantial agglomeration thereof—mineral oil, in an amount equal to about 2–15% of the weight of the black, and thereafter tumbling the black until substantially all of it has been converted to pellets. Even though skilled artisans are aware of the basic process requirements for producing ink pellets of the highest quality, the techniques have remained mostly theoretical, since no process was heretofore available which actually effected uniform dispersion of oil over the black particles to the extent desired. Consequently, a need persisted for an improved and more practical method of producing ink pellets of higher quality under economically acceptable conditions.

In U.S. Pat. 3,011,902 it is disclosed that the oil should be added to the black particles prior to any amount of agitation sufficient to densify or agglomerate the black to an extent such that the fluid cannot be substantially uniformly distributed over the bulk of the black being pelletized. From the examples of the patent it is learned that this effect may be accomplished by slow and/or gentle stirring of a bed of the carbon black while spraying the oil onto the surface of the bed. The object of this slow and gentle stirring is to alter the surface of the bed so that all of the particles are exposed to the spray of oil.

Although it is essential that uniform coating of the black particles with oil must take place before any substantial aggregation of the carbon particles occurs, blending methods taught by the prior art are far from ideal since they do not disclose a technique which imparts extremely rapid motion to ultrafine particles so that the particles of black and oil are thoroughly dispersed and comixed during the blending operation. Consequently, oil coating of the black particles within ink pellets has not been as thorough and uniform as desirable, and far from ideal, so that ink pellets produced in accordance with the teaching of U.S. Pat. 3,011,902 frequently have a 325 Mesh Residue in excess of a maximum acceptable value. The pellets must be screened prior to compounding in an ink formulation to remove pellet fractions smaller than a certain diameter in order to exclude excessive residue from the finished product. A process is described in U.S. Pat. 3,294,567 whereby ink pellets produced in accordance with the process of U.S. Pat. 3,011,902 are screened after formation to remove fractions which are smaller than 150 microns; and, more preferably below 280 microns. This operation is carried out specifically to reduce the 325 Mesh Residue to a value not exceeding 0.03% by weight, since higher values are generally not acceptable to an ink compounder, and patentees discovered that removal of a reject fraction of smaller size pellets provided a select fraction of larger size pellets having acceptable residue values. However, the finer pellets which are removed from the product stream are said to comprise from about 5% to about 20% by weight of the total original pellets, and it is necessary to grind and repelletize this reject fraction before the black therein can be returned to the product stream. Naturally, separation, grinding and repelleting of reject pellets are objectionable steps since they make the process more difficult and costly to operate.

BRIEF SUMMARY OF THE INVENTION

It is therefore an object of this invention to provide an improved process for producing ink pellets of carbon black with an oil pelletizing medium.

Another object is to provide a process for producing ink pellets whereby the weight of pellets in excess of about 250 microns diameter is greater than about 95% prior to any size separation of the pellets.

Yet another object is to substantially reduce or eliminate the need for size classification of ink pellelts after formation thereof.

Even another object is to provide ink pellets which more readily disintegrate during formation of the ink compound.

Still another object is to provide a carbon black, in ink pellet form, which more readily disperses in ink vehicles during the compounding of printing inks.

Even another object is to provide ink pellets characterized by an unusually low 325 Mesh Residue value when compounded into an ink formulation.

Yet another object is to provide ink pellets characterized by an unusually high NYPC Fineness Gauge value when compounded into an ink formulation.

In the present invention, a confined body of fluffy carbon black particles is subjected to intense agitation so that the particles are set into rapid, churning motion while being thoroughly scattered and dispersed. Concomitantly, an oil pelletizing medium is injected into the body of dispersed carbon black particles as a micro-atomized fog of liquid particles. The intense agitation is continued in order to thoroughly comix the black and oil while the confined particles thereof are rapidly scattered and tumbled about. The particles are thus maintained in a dispersed state under the intensely applied agitation until the carbon black particles are uniformly coated with oil. Thereafter, the oil-coated carbon black particles are recombined from the dispersed state to form a denser bed of particles which is subjected to relative mild tumbling action by means of agitation which is substantially less severe than exists during oil coating of the particles. This mild agitation of the bed of oil coated particles is continued until the particles form into pellets.

Conventional pin type or rotary drum type pelletizers may be employed for supplying the tumbling action needed for forming the pellets but it should be pointed out that the degree of agitation employed with the present invention during oil coating of the black is substantially greater than exists within either pin type pelletizers or rotary drum pelletizers as are conventionally employed in the carbon black industry. In conventional pelletizers, the agitation must necessarily be relatively mild in order that pellets form at all, i.e. the agitation must be sufficient to tumble the carbon black particles so that they agglomerate into pellets, but if the agitation is too great the force imparted to the mass reaches a level which is destructive to pellet nuclei and agglomeration cannot proceed. Agitation sufficiently great to prevent pellet formation is, however, precisely what is employed during the carbon-particle-oil coating step of the present invention, since such severe agitation not only prevents agglomeration of the particles until adsorption of the oil by the black is completed, but the particles are also kept in a constant state of dispersion, while tumbling about, so that an ever changing array of discrete-particle surfaces is presented for contact with the micro-atomized liquid particles of oil. As a consequence, discrete particles of black are contacted with discrete particles of oil so that nonuniform combination of ingredients of the blend is avoided by preventing premature agglomeration of the carbon particles and/or coalescence of the oil particles.

Thus, the present invention provides far more thorough and uniform coating of the carbon particles with the oil, and pellets formed by subsequent tumbling of these particles have surprisingly good characteristics which make them especially suitable for compounding in printing ink formations. It has been discovered, for instance, that the pellets may be characterized by the fact that in excess of about 95% by weight thereof have a diameter exceeding 250 microns prior to any size separation procedure to which they may be subjected, e.g. screening. Accordingly, any necessity for size classification of the pellets in order to up-grade quality may be eliminated. Furthermore, these same pellets may be characterized by a 325 Mesh Residue value which is consistently and substantially below 0.03%. They may also have a NYPC Fineness Gauge value of six or higher.

The oil pelletizing medium used in producing ink pellets in accordance with this invention is not critical since any oil which may be utilized for producing ink pellets is usually entirely suitable. However, the amount of oil added to the black must be controlled within the limits of about 2–25 weight percent of the black, and more generally 2–10 weight percent, to produce pellets of commercially acceptable quality. The oil pelletizing medium may be unaltered from its original form prior to atomization and application to the carbon black particles, but where preferable and practical it may first be converted to an oil and water emulsion, or heated, to aid in distribution of the oil over the surfaces of the carbon black particles.

The type carbon black which is pelletized in accordance with the invention is likewise not critical although it will be understood that, ordinarily, the only grades involved will be those which are usually employed in inks.

Though not wishing to be bound by theory, it is felt that the superior quality of the ink pellets produced in accordance with this invention results from the fact that the carbon black from which the pellets are composed is provided with a more thorough and uniform coating of oil over all of the particles. This effect is accomplished by employing previously unparalleled particle dispersion and mobility during the carbon-oil blending step which provides exceptional opportunity for the oil to contact and coat all sides of the carbon-particle surfaces while the particles remain dispersed and, therefore, unagglomerated.

DETAILED DESCRIPTION OF THE INVENTION

The invention will be further described with reference to specific embodiments thereof, but it will be understood that other accordant embodiments will become apparent from this description and the appended claims.

For blending the carbon black and oil, a continuous liquid-solids blender which embodies a rapidly whirling agitator for dispersion of black and oil may be employed. Blenders of this type which have been employed in carrying out the present invention are manufactured by the Patterson Kelly Co., Inc., East Stroudsberg, Pa., and are illustrated and described in their Bulletins No. C-3 and CLS-2. Generally, these blenders comprise an essentially cylindrical or conical mixing chamber having transversally extending discs centered therein which are mounted on a rotatable axial shaft. The discs are equipped with bent, radially projecting, knife-like blades which further enhance dispersion of carbon black and oil during the blending step. Oil is supplied to the mixing chamber at a constant rate through one or more small annular orifices at the edges of the discs. By rotating the discs at high speed, e.g. 1000–3500 r.p.m., a liquid stream of oil is converted by the intense shear created by centrifugal force into a micro-atomized fog of particles which discharge radially into the mixing chamber. Fluffy carbon black may be supplied to the chamber at a constant rate by means of any suitable method but process and apparatus as described in U.S. Patent 3,434,808 may be used to particular advantage for supplying the black under pressure to the mixing chamber at a very uniform feed rate. After being introduced into the mixing chamber, the carbon black is immediately subjected to the intense agitation of the rapidly whirling disc and blade assembly so that the fluffy carbon black particles are scattered and dispersed within the chamber while being formed into a swirling body and tumbled about at a high rate of speed. In order to assure adequate dispersion of the black particles, it is essential, of course, that the fluffy black be supplied to the chamber at a rate which does not cause the chamber to flood and bring about compaction of the charge of particles therein. On the other hand, the black should be supplied to the chamber at a sufficient rate which results in formation of a body of dispersed black particles which surrounds the locus from which the micro-atomized fog of oil particles is discharged into the chamber. The swirling body of black particles should be dense enough to prevent the oil particles from traversing the distance between the oil discharge orifice and the mixing chamber wall lest the oil impinge on the wall and result in caking of the black thereon. Ideally, the mixing chamber is provided with a somewhat restricted outlet to produce a slight back pressure within the mixing chamber to prevent channeling and premature discharge of the carbon black and oil before thorough contacting has taken place in the treating space. Furthermore, a restricted discharge outlet may also serve the purpose of recombining the oil-coated particles from the dispersion as they continuously discharge from the mixing chamber, thus forming the particles into a denser mass which can be gently tumbled to form beads. When the mixing chamber has a conical shape, the oil-coated particles may be discharged from the small end thereof to effect the recombination.

While superfine nozzles may be affixed to the rapidly spinning discs to produce the micro-atomized fog of oil, subdroplet particles can be formed as previously stated by means of a small annular orifice at the edge of the discs. The faces of two discs may be opposed and separated with a spacing of only a few thousandths of an inch to produce a suitable annular orifice which is supplied with oil through openings which communicate with an oil feed passageway within the axial shaft which is employed to rotate the discs. The precise width of the annular orifice will depend, of course, upon the viscosity of the oil pelletizing medium, the rate at which it is discharged into the chamber, the rotational speed of the discs and other factors, but the proper width for any given operation can be determined by simple experimentation. The primary consideration in establishing the orifice size is that substantially all of the oil pelletizing medium which is injected into the mixing chamber be atomized into a fog of particles of microscopic size prior to any substantial commingling of the oil with the particles of black. The term "micro-atomized fog of particles" may further be taken to mean a stable mist of particles which do not tend to readily coalesce, as opposed to an unstable spray of droplets which coalesce promptly. Generally, therefore, the oil should be atomized to a particle diameter below about 150 microns and more preferably to a particle size of 100 microns or less. It will be understood that more than one orifice may be employed to provide a good distribution of the oil throughout the mixing chamber. Therefore, a number of discs, all bearing blades, may be arranged on the rotatable shaft to provide compounded atomization of the oil and dispersion of the oil and black particles. Discs having an annular orifice may also be aligned nonperpendicularly on the rotatable shaft to discharge the atomized oil particles in a wide band across the mixing chamber.

Of course, the whirling agitator assembly can have many effective configurations other than those mentioned above. In fact, it is not essential to this invention that mechanical agitation be employed in the blending step since the particles of black and oil may be kept separated and highly mobile by highly turbulent flow of a suitable non-reactive gas, e.g., air. For instance, by employing a fluid energy mill as the blending device, the black and oil may be combined in accordance with the invention while attriting undesirable aggregates and/or agglomerates of the black at the same time that blending is being accomplished. In such operations, carbon black is fed continuously into the grinding chamber of the fluid energy mill and high velocity jets of air, e.g. Mach 2-6, are directed into the chamber in such a manner that the particles of black are set into rapid motion by energy supplied by the jet streams. The black particles become scattered in the air and aggregates and/or agglomerates are attrited by impact and friction between particles and between particles and internal surfaces of the grinding chamber. Oil may be added to the grinding chamber and converted into micro-atomized fog of liquid particles within the grinding chamber by the intense, shearing agitation created with the air jets. Advantageously, the oil may be entrained within the air jets themselves by simple mechanical means, e.g. an atomizer nozzle. Since accordant treatment of the blacks in a fluid energy mill provides the dual advantage of uniform oil coating and attrition of undesirably large particles, the resultant ink pellet product may be characterized by exceptional dispersion and platewear properties when compounded into an ink formulation.

Where the previously mentioned highly turbulent gas flow is used to churn the dispersed particles during the blending step, the oil coated black particles may be recombined by passing the resultant aerosol into a suitable gas-solids separator, a cyclone for instance.

As was previously pointed out, gently tumbling of the oil-coated particles to convert them into pellets may be accomplished in a conventional pin type or rotary drum pelletizer, and the proper conditions for production of the pellets can be readily determined by those skilled in the art by the usual experimental procedures. Agitation of the carbon particles during the pelletizing step must be substantially less severe than during the oil coating step and it has been found that superior quality pellets can be produced in a rotary drum pelletizer wherein tumbling of the particles is accomplished by cascading of a bed of the particles as the drum rotates, no vanes or other agitating members being employed to stir, lift or plough the bed.

Since either pin type or rotary drum pelletizers can be made to operate continuously, they may be coupled with the liquids-solids blender for oil and carbon black to provide a continuous process wherein blending and pelletizing are carried on simultaneously. The liquids-solid blender may be arranged, in fact, to discharge directly into the inlet end of the pelletizer. Finished product pellets may be removed from the discharge end of the pelletizer and bagged or otherwise packaged for shipment or storage.

To more clearly demonstrate the advantages and beneficial results of the present invention, and to illustrate the manner in which it may be practiced, specific examples are presented below. It will be understood that these examples are, however, illustrative in nature and should not be construed so as to limit the scope of this invention.

EXAMPLE I

Five samples were selected or prepared for comparative testing of the pellets of this invention with the powdered parent black and ink pellets produced by other processes. The samples were as follows:

Sample 1

Statex F-12 in fluffy powder form. Statex F-12 is a commercial available oil furnace black marketed to newsink formulators.

Sample 2

Statex F-12 fluffy powder blended with 8 percent by weight of an aromatic fuel oil in a liquid-solids blender as previously described and then pelletized in a laboratory scale rotary drum pelletizer. (Pellets of invention.)

Sample 3

Statex F-12 fluffy powder blended with 8 percent by weight of the same aromatic fuel oil by spraying the oil on the surface of the black and stirring as described in Example 1 of U.S. Pat. 3,011,902. The oil coated carbon particles were then pelletized in a laboratory scale drum pelletizer in the same manner as Sample 2, above.

Sample 4

A commercially available ink pellet prepared from carbon black and an oil pelletizing medium.

Sample 5

Statex F-12 fluffy powder that was pelletized in the laboratory scale rotary drum pelletizer without the addition of an oil pelletizing medium.

These samples were mixed 13 percent by weight into a typical newsink oil using a Brookfield counter-rotating mixer. Mixing conditions were held constant for each sample. This type of mixer develops much less shear than commercial ink mixing procedures but is quite useful in laboratory control tests since the use of lower than normal shear magnifies differences in dispersing capability of the black in the pellets, i.e. high shear mixing tends to nullify these differences, and shear development in commercial ink mixing equipment is not usually "high" and varies from one process to the next.

After mixing, the inks were tested to determine the dispersion of the samples therein.

Tests used for determining the degree of dispersion were 325 Mesh Residue and NYPC Fineness Gauge, both of which are standard tests used throughout the ink industry. Procedures for conducting these tests are adequately described in the prior art, e.g. U.S. Pat. 3,011,902.

Dispersion test data are shown below:

TABLE I

| Sample | 325 Mesh Residue, percent | NYPC ratings | | | Impression rating |
|---|---|---|---|---|---|
| | | 6 minutes | 9 minutes | 12 minutes | |
| 1 | 0.1424 | 6 | 8 | 10 | Very good. |
| 2 | 0.4768 | 3 | 6 | 9 | Good. |
| 3 | 0.9484 | 0 | 4 | 6 | Fair. |
| 4 | 1.1296 | 0 | 4 | 6 | Do. |
| 5 | 2.6708 | 0 | 1 | 2 | Poor. |

These data clearly demonstrate that ink pellets produced in accordance with the present invention (Sample 2) disperse significantly faster than conventional dry pellets (Sample 5), or oil-carbon pellets produced, in accordance with prior art procedures (Samples 3 and 4).

It should also be pointed out that after 12 minutes of mixing, the finished ink produced with the pellets of this invention was comparable in color and viscosity development to that obtained with the unpelletized powder, while the inks produced with the other pellets were somewhat lower in color and viscosity because of poorer dispersion of the blacks.

EXAMPLE II

Seven samples were collected from three different commercial scale operations for producing ink pellets, the object being to compare pellet properties. All of the samples were produced from a high structure HAF type carbon black using an aromatic fuel oil, marketed under the name of Aromatic Concentrate, as the pelletizing agent. The samples were produced as follows:

Samples A, B and C

The carbon black in fluffy powdered form and aromatic fuel oil were supplied to a 16 inch Model CLSS Patterson-Kelly Liquid-Solids Blender to produce oil-coated carbon black pellets at the rate of 1200 lbs. per hour. The black and oil were supplied to the blender to produce a mixture which was 8% by weight of oil. The oil was not emulsified or heated prior to atomization. The width of the annular orifices for atomizing the oil was 0.010 inch. The discs were rotated at 1050 r.p.m. while oil was supplied to the orifices at 20 p.s.i.g. Carbon black was fed to the mixing chamber of the blender by means of a pump as described in the aforementioned pending patent application. The oil coated carbon particles were passed from the blender directly into the rotary drum pelletizer having a length of 24 feet and an inside diameter of 6′10″. The drum was rotated at a speed of 13 r.p.m. and it was not equipped with vanes or other devices for stirring the bed of particles.

Sample D

The carbon black in fluffy powder form was fed at the rate of 1200 lbs. per hour to a conventional pin type mixer turning at 250 r.p.m. while oil at the rate of 104 lbs. per hour was sprayed onto the surface of the black as it underwent agitation in the mixer. Thus, the oil and black were proportioned to provide a blend mixture of 8% by weight of oil. The mixer had a length of 8 feet and a diameter of 16 inches. The residence time of the blend within the mixer was approximately 3 to 5 minutes.

After blending, the oil coated black was discharged into a rotary drum and pelletized in the same manner as Samples A, B and C.

Samples E, F and G

The carbon in fluffy powder form was fed at the rate of 1200 lbs. per hour into the inlet end of the rotary pelletizer employed for Samples A, B and C while the oil was sprayed onto the black at the rate of 104 lbs. per hour as the black entered the pelletizer. Thus the blend mixture proportion was 8% by weight of oil and the oil was contacted with the carbon black before the latter was subjected to the tumbling section of the pelletizer. Conditions of pelletizing were the same as for Samples A, B and C.

Pellet properties of each of the samples is shown below.

TABLE II

| Sample: | Pour density, lbs./cu. ft. | Solvent extractables | 325 mesh ink residue, percent |
|---|---|---|---|
| A | 18.0 | 7.9 | .0044 |
| B | 17.6 | 8.0 | .0062 |
| C | 18.0 | 7.8 | .0041 |
| D | 19.5 | 7.8 | .5000 |
| E | 16.8 | 6.8 | .0224 |
| F | 16.8 | 8.1 | .0276 |
| G | 17.4 | 7.1 | .0312 |

Thus, the superior dispersing properties of the pellets of this invention (Samples A, B and C) are again adequately demonstrated since their 325 Mesh Residue values are lower than those of pellets made by the prior art techniques (Samples D, E, F and G). It is also significant to note that residue value of the pellets made in accordance with this invention were, consistently, almost one whole order of magnitude lower than the maximum acceptable value, 0.03%.

Since U.S. Pat. 3,294,567 emphasizes the necessity for removing pellets smaller than about 150 microns, and preferably below 280 microns, to control 325 Mesh Residue to an acceptable value, it will again be pointed out that the present invention may be employed to produce pellets which require no separation to achieve a residue value below 0.03% since in excess of 95% by weight of the pellets may have a pellet diameter in excess of about 250 microns prior to screening. This is demonstrated by the data in Table III which shows size analysis of Samples A, B and C as removed from the pelletizer and without any preliminary size classification:

TABLE III

| | Percent | | | | Percent total, +0.25 mm. |
|---|---|---|---|---|---|
| | +2 mm. | +1 mm. | +0.5 mm. | +0.25 mm. | |
| Sample: | | | | | |
| A | 1.0 | 20.0 | 65.0 | 11.0 | 97 |
| B | 1.0 | 38.0 | 53.0 | 5.0 | 97 |
| C | 0.5 | 35.0 | 54.0 | 7.0 | 96.5 |

It has also been found that the present invention also eliminated two problems which were prevalent in prior processes for producing ink pellets: (1) the necessity for adding excess oil to achieve uniform coating of the black particles, and (2) caking of oil and carbon black on the mixing chamber walls during the blending step. With the present invention blending of black and oil is so homogenous that uniform coating of the particles can be achieved with a precise amount of oil, with relatively complete and uniform take-up of the oil as indicated by the solvent extraction values in Table II.

Caking of the carbon black and oil during the blending operation can seriously hamper efforts to achieve homogenization of oil and black since the cake continuously forms, breaks loose and enters the effluent stream from the blender as clumps containing various amounts of oil and black. In the present invention, however, the atomized stream of oil within the mixing chamber can be completely surrounded with black particles so that the walls are protected from oil droplets which may impinge thereon. Furthermore, as in a case where a fluid energy mill is employed as the mixing chamber, the turbulent agitation therein may be so severe that it is impossible for any cake to form.

EXAMPLE III

Using a fluid energy mill as described in copending patent application Ser. No. 694,648, filed Dec. 29, 1967, a low structure, long flow oil furnace black was fed to the milling chamber in the form of dry-produced pellets while an aromatic fuel oil was introduced into the chamber at a rate which provided 8%, by weight, of oil addition to the carbon black. Within the chamber of the fluid energy mill the pellets of carbon black were reduced back to fluffy particles and subjected to rapid churning motion while in a dispersed state. The oil was added to the jets of air which were introduced into the mill for the purpose of agitating the black, thus producing a micro-atomized fog of liquid particles which could be intimately contacted with the dispersed, fluffy particles of carbon black. Because of the intense turbulent agitation which existed within the milling chamber of the fluid energy mill, the carbon black particles were subjected to attrition while being thoroughly coated with oil. Accordingly, undesirable aggregates of the carbon particles were reduced to more discrete particles during the oil coating process. Subsequently, the aerosol of oil coated particles and grinding air were passed into a cyclone separator for combination and recovery of the particles. The oil coated particles were then passed into the rotary pelletizer of Example I and tumbled therein until essentially all of the black was converted into ink pellets.

In testing the ink pellets of this example, they were compared against the dry pellets which were fed into the fluid energy mill and the uncompressed, fluffy carbon black from which the dry pellets were originally formed. All three blacks were mixed at 22% by weight in Litho 3 for one pass on a 3 roll laboratory mill set at 350 p.s.i. The dry-produced beads did not disperse at all, the uncompressed fluffy black dispersed well, and the oil pellets produced in accordance with the invention dispersed 5.2% better, according to a visual rating. In addition, the oil pellets of the invention imparted equivalent color to the ink compound.

In each of the foregoing examples the aromatic fuel oil with which the black was coated had properties essentially as follows:

TABLE IV

| | |
|---|---|
| API Gravity | .2 |
| Viscosity, SSU @ 130° F. | 594 |
| SSU @ 210° F. | 67 |
| Molecular weight | 295 |
| BMCI | 123 |
| Index of Refraction | 1.648 |
| Wt. percent sulfur | 1.060 |
| Wt. percent ash | .003 |
| Wt. percent benzene insolubles | .039 |
| Wt. percent asphaltenes | .50 |
| UOP K Factor | 10.0 |
| Ave. B.P., ° F. | 790 |
| Specific gravity | 1.0744 |
| Lb./gal. | 8.949 |

| Ultimate analysis: | Wt. percent |
|---|---|
| Carbon | 89.94 |
| Hydrogen | 8.29 |
| Sulphur | 1.03 |
| Ash | 0.03 |
| Other | 0.71 |

While the invention has been described herein with reference to particular materials, apparatus and combinations thereof, it will be readily apparent that various changes and modifications can be made therein within the scope of the invention as set forth in the appended claims.

Therefore, what is claimed is:

1. In a process for producing ink pellets of carbon black and oil by first coating the particles of black with oil and then tumbling the oil-coated particles to form pellets, the improvement which comprises:

(a) subjecting a confined body of fluffy carbon black particles to intense agitation and thereby setting the confined black particles into rapid, churning motion while in a dispersed state, (b) contacting an oil pelletizing medium with said intensely agitated dispersed particles of black, said oil being in the form of a micro-atomized fog of liquid particles while being contacted with said black particles, the proportion of oil in the resulting mixture being within the limits of about 2–25 weight percent of the black, (c) continuing the intense agitation and thus maintaining the black and oil in intimate comixture while the confined particles thereof are rapidly tumbled and further maintaining the particles in a dispersed state under the intense agitation until the carbon black particles are uniformly coated with the oil, the degree of said agitation being substantially greater than that required for formation of pellets of the oil-coated carbon black particles, (d) thereafter recombining the oil coated particles into a substantially denser bed of particles and subjecting said bed to relatively mild tumbling action and continuing the mild tumbling of said bed until the particles therein are formed into pellets characterized by at least about 95% by weight of the pellets having a particle diameter in excess of about 250 microns prior to any size separation thereof and a 325 Mesh Residue value of below about 0.03% by weight.

2. The process of claim 1 wherein the pellets are further characterized by a NYPC Fineness Gauge value in excess of six.

3. The process of claim 1 in which the oil-coated carbon black particles are tumbled within a rotary drum to produce the pellets.

4. The process of claim 1 in which the proportion of oil in the dispersion of carbon black and oil particles is 2–10% by weight of black.

5. The process of claim 1 in which the dispersed carbon black particles are formed into a swirling body which surrounds the locus from which the micro-atomized fog of oil particles is discharged for comixture with the black.

6. The process of claim 4 in which the oil is subjected to shear resulting from centrifugal force to form the micro-atomized fog of liquid oil particles.

7. The process of claim 1 in which the intense agitation of the dispersed particles is accomplished by mechanical agitation.

8. The process of claim 6 in which the micro-atomized oil particles have a diameter below about 150 microns.

9. The process of claim 1 in which the intense agitation of the confined particles of black and oil is accomplished by contact with a highly turbulent flow of nonreactive gas.

10. The process of claim 9 in which the nonreactive gas is air.

11. The process of claim 9 in which the carbon black particles are attrited by the intense agitation thereof.

12. The process of claim 9 in which the intense agitation of the confined particles is derived from contact with high velocity jets of a nonreactive gas.

13. The process of claim 9 in which the oil pelletizing medium is entrained within the nonreactive gas.

References Cited

UNITED STATES PATENTS

| | | | |
|---|---|---|---|
| 3,434,808 | 3/1969 | Pabst, Jr. | |
| 3,258,355 | 6/1966 | Voet | 106—307 |
| 3,282,719 | 11/1966 | Voet | 106—307 |
| 3,356,520 | 12/1967 | Daniell | 106—307 |
| 3,391,234 | 7/1968 | Walenciak et al. | 106—307X |
| 3,011,902 | 12/1961 | Jordan | 106—307 |
| 3,294,567 | 12/1966 | Dobbin et al. | 106—307 |

TOBIAS E. LEVOW, Primary Examiner

H. M. S. SNEED, Assistant Examiner

U.S. Cl. X.R.

23—314; 106—308; 241—5, 16